June 27, 1967  R. S. WILKES  3,327,840
ADJUSTABLE LIVESTOCK FEEDER
Filed July 21, 1965  2 Sheets-Sheet 1
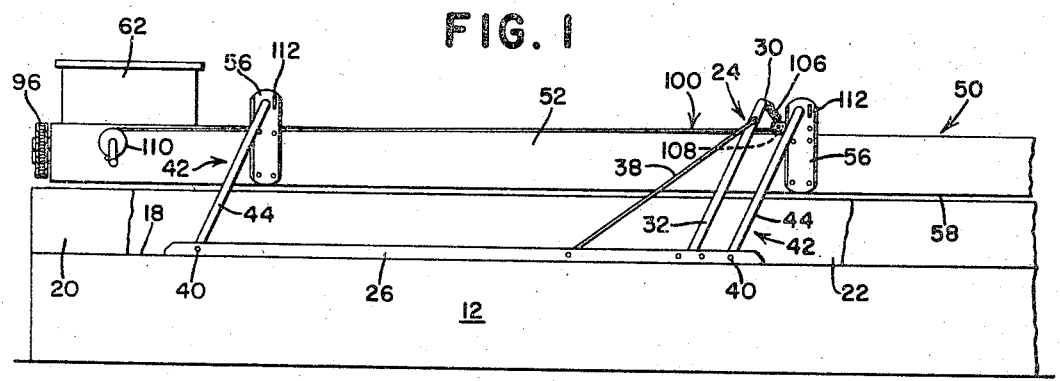
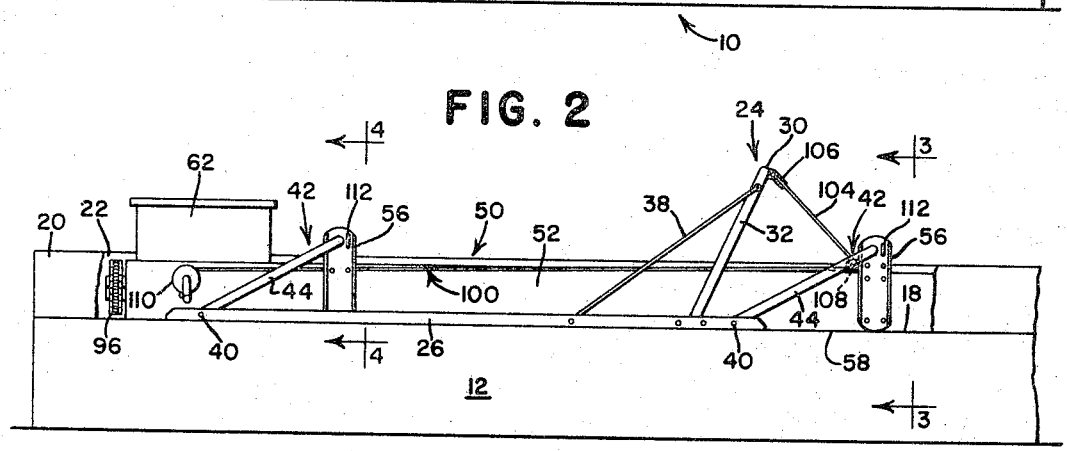
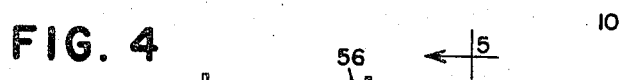
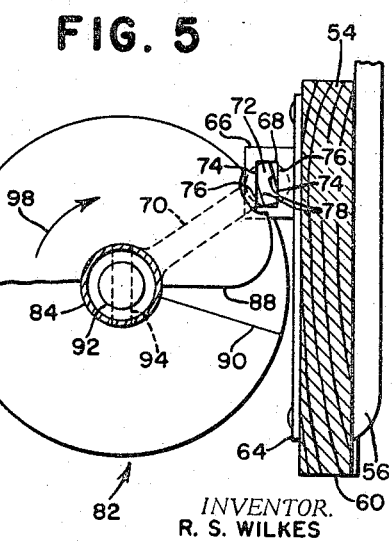
INVENTOR.
R. S. WILKES

INVENTOR.
R. S. WILKES

United States Patent Office 3,327,840
Patented June 27, 1967

3,327,840
ADJUSTABLE LIVESTOCK FEEDER
Raymond S. Wilkes, Moline, Ill., assignor to Deere & Company, Moline, Ill., a corporation of Delaware
Filed July 21, 1965, Ser. No. 473,767
16 Claims. (Cl. 198—213)

This invention relates to a material conveying and distributing device and more particularly to an improved auger type conveyor used in a livestock feeder or the like.

In U.S. Patents 3,245,516 and 3,256,972, there is shown a livestock feeder including an elongated bunk including a floor and an elongated conveyor suspended above the floor on a plurality of support members pivotally mounted on the floor for swinging in a longitudinal vertical arc to raise and lower the conveyor relative to the floor. As described in said applications, the conveyor includes a pair of opposite upright retaining walls and an auger supported between the retaining walls, the retaining walls initially being supported close to the floor to allow the feed to build up along the length of the conveyor, the conveyor then being raised in increments to allow successive layers of feed to build up and to allow the feed to move under the retaining walls to the bunk floor, where it is accessible to the livestock. The vertical position of the conveyor described in said applications is established by a suspension control means extending between the conveyor and a support or frame rigidly projecting upwardly from the floor.

According to the present invention, there is provided an improved frame or support to which the suspension control means is connected. A more specific object is to provide such a frame of simple and economical construction, which does not limit the access of the livestock to the feed, and which further reduces the force exerted through the suspension control means necessary to raise the conveyor and support it in an elevated position.

Previous conveyors of this type have experienced high torque loads and plugging of the conveyor when moving certain materials, such as partially frozen or coarsely ground ensilage. The augers in such conveyors are generally supported at intervals on support arms which necessarily interfere with the movement of material. The conveyors are thus particularly subject to plugging and high-impact torques at the support arms.

According to another feature of the present invention, an improved method of supporting the auger between the retaining walls is provided to reduce the high-impact torques and plugging of the conveyor. More specifically, it is an object to support the auger with its down-turning side close to the adjacent wall to prevent the buildup of material between the down-turning side and the retaining wall.

It is another object to support the auger between the retaining walls on vertically swingable support arms whereby the auger will swing upwardly from the bank floor and away from the retaining wall adjacent the down-turning side of the auger in the event that material becomes wedged between the auger and said retaining wall or between the auger and the floor.

Another object is to provide a clearance between the discharge side of the auger flight and each support arm in order that a slug of material will not wedge between the flight and the support arm, and further to provide such an auger with the intake side of the auger flight proximate to the support arm to immediately pick up the material as it moves past the support arm.

These and other objects will become apparent from a consideration of the following detailed description and drawings wherein:

FIG. 1 is a side elevation view of one end of the livestock feeder with portions of the side boards removed, the conveyor being shown in a raised position.

FIG. 2 is a view similar to FIG. 1, but with the conveyor in a lowered position.

FIG. 4 is an enlarged plan view of a portion of the auger and retaining walls at a support arm.

FIG. 5 is a section view taken along the line 5—5 of FIG. 4 with the auger supported in a lowered position relative to the retaining walls.

Figure 3:
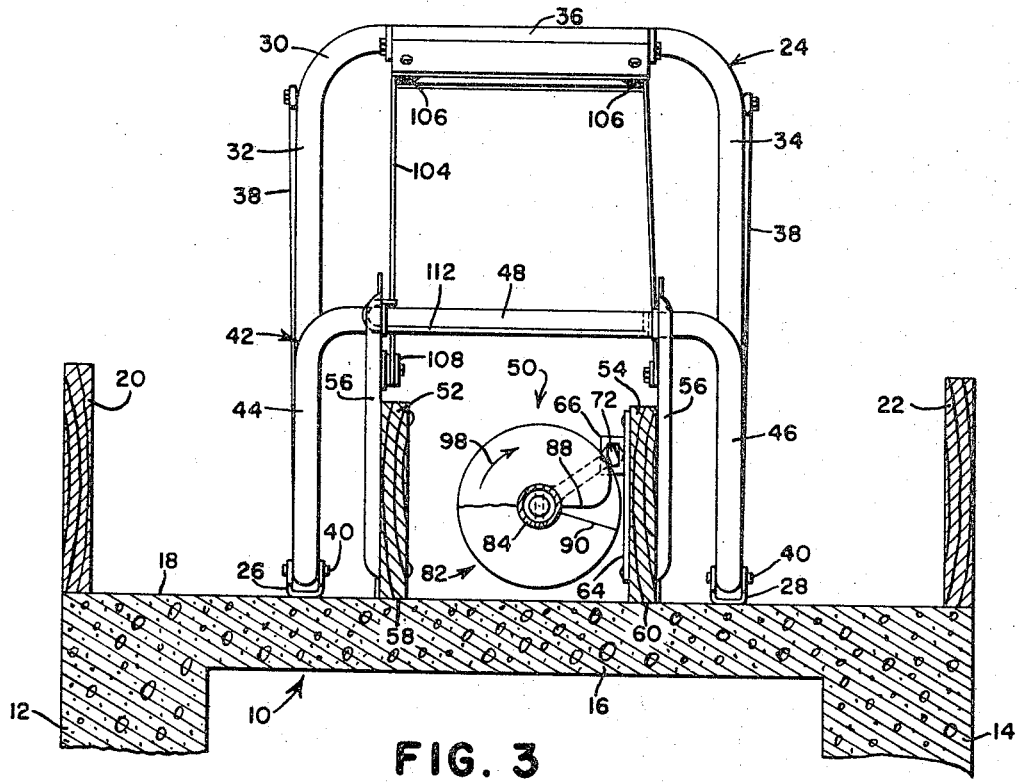
FIG. 3 is an enlarged sectional view along the line 3—3 of FIG. 2.

In the drawings, there is shown an elongated feed bunk 10 including opposite upright legs 12 and 14 and a horizontal table portion 16 supported on the legs 12 and 14, the top surface of the table portion 16 forming a material receiving floor 18. The bunk is preferably made of concrete or the like, although other materials may readily be used. Opposite side boards 20 and 22 extend vertically from the longitudinal edges of the floor 18 and form, in conjunction with the floor 18, a trough which retains the feed.

A frame 24 is mounted on the floor 18 and includes a pair of opposite, longitudinally extending channels 26 and 28, and an inverted U-shaped frame member 30 rigidly extending upwardly from the floor and having opposite legs 32 and 34, connected at their lower ends to the channels 26 and 28 respectively, and a horizontal bight portion 36. The frame member 30 is longitudinally inclined and supported in its inclined position by a plurality of brace members 38. Although the frame 24 is shown adjacent one end of the bunk 10, the frame could be located anywhere along the length of the bunk.

A plurality of transverse pivots 40 are mounted on the floor 18 in alined pairs longitudinally spaced along the length of the bunk 10, the pivots 40 shown in the drawings being mounted on the floor via the channels 26 and 28. Additional pivots 40 (not shown) are mounted on the floor of the bunk in the conventional manner, the number of pivots depending on the length of the bunk.

An inverted U-shaped support member 42, having opposite legs 44 and 46 connected by a transverse horizontal bight portion 48, is rockably mounted at its ends on each pair of pivots 40 for swinging in a longitudinal vertical arc. An elongated longitudinally extending conveyor, indicated generally by the numeral 50, is carried by the support members 42 and includes a pair of elongated, opposite, upright, longitudinaly extending retaining walls 52 and 54 suspended from the horizontal bight portions 48 of the support members 42 by a plurality of plates 56, a pair of transversely spaced plates swingably depending from each horizontal bight portion 48. The retaining walls 52 and 54 thus swing in a longitudinal vertical arc with the support members 42 between a lowered position in which their respective lower edges 58 and 60 rest on the floor 18 and a raised position in which their lower edges are spaced above the floor 18. A material-receiving hopper 62 is carried by the retaining walls 52 and 54 at the intake end of the conveyor 50, the end of the hopper 62 being vertically alined with the end of the bunk when the retaining walls are in their raised position.

The retaining walls 52 and 54 are preferably provided in sections joined at each plate 56, each section being supported at its ends by a support member 42. The number of sections, and consequently the number of support members 42, thus depends on the length of the bunk 10 in the particular installation.

Figure 6:
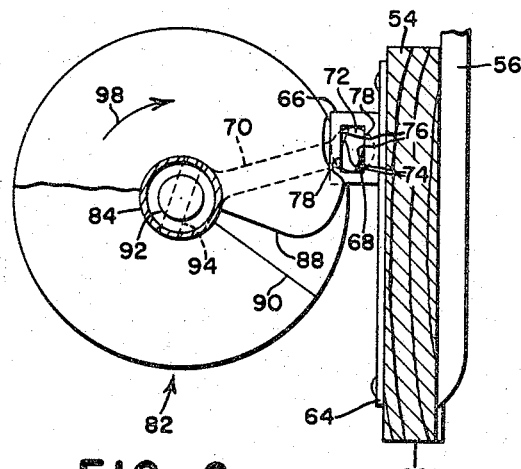
FIG. 6 is a view similar to FIG. 5 with the auger supported in a raised position relative to the retaining walls.

A plurality of brackets 64 are mounted on the retaining wall 54 at the end of each retaining wall section and include a pair of transverse ears 66 having rectangular, longitudinally alined apertures 68. A transverse support arm 70 has a pair of longitudinally extending lugs 72 at one end, each lug having a generally hexagonal transverse cross section, a support arm 70 being connected to each bracket 64 by means of the lugs 72 which extend through the apertures 68. The support arms are swingable in a limited vertical arc transverse to the retaining walls 54 between a lowered position, as shown in FIGS. 3 and 5, in which the opposite edges 74 of the lugs engage the opposite sides 76 of the apertures, and a raised position, as shown in FIG. 6, in which the opposite edges 78 of the lugs engage the sides 76 of the apertures 68. The lug edges 74 and 78 intersect at an approximately 160° angle, thereby limiting the movement of the support arm 70 to approximately a 20° arc.

The opposite end of each support arm 70 forms a journal 80 in which an elongated auger 82 is rotatably supported between the retaining walls 52 and 54 and above the floor 18. The auger 82 is preferably provided in a plurality of coaxially joined sections corresponding in length to the retaining wall sections, each section including an axial shaft 84 and a helical flight 86 having an intake end 88 and a discharge end 90. The adjacent auger sections are connected by a cylindrical member 92 supported in the support arm journal 80 and having its opposite ends connected to adjacent auger sections by means of transverse pins 94.

The auger 82 is rotated by a drive means 96 in the direction of the arrow 98 to move the material from the hopper 62, which feeds the intake end of the first section of the auger 82, along the bunk 10 (from left to right in FIGS. 1, 2, and 4).

As best seen in FIG. 4, the auger flight 86 is interrupted at each support arm 70, the discharge end 90 of each auger section being spaced from the support arm 70 at the journal 80 to provide a clearance which permits most material to flow off the end of the auger flight without becoming wedged between the support arm and auger flight. A clearance of from 1.5 inches to 3 inches has been found to produce satisfactory results. A relatively small clearance is provided between the intake end 88 of each auger flight and the support arm 70 at the journal 80, so that the succeeding auger section will immediately pick up the material. The support arm 70 is slightly canted so that the support arm is approximately centered at the retaining wall 52 between the intake end 88 of one section and the discharge end 90 of the preceding section.

The weight of the auger 82 normally maintains the support arms 70 in their lower position, as shown in FIGS. 3 and 5, wherein the auger 82 is supported with its lower edge approximately in the same horizontal plane as the lower edges 58 and 60 of the retaining walls 52 and 54. In this position the down-turning side of the auger 82 is proximate to the retaining wall 54, and, as shown in FIG. 3, the up-turning side of the auger 82 is spaced a relatively large distance from the opposite retaining wall 52. When the support arms 70 swing to their raised position, as shown in FIG. 6, the auger 82 swings upwardly and away from the retaining wall 54, providing a substantial clearance between the down-turning side of the auger and the retaining wall 54 and the bottom of the auger and the floor 18.

The vertical position of the conveyor 50 is established by a suspension control means 100 interconnecting the conveyor 50 and the frame 24. The suspension control means is shown herein as a winch device mounted on the retaining wall 52 and including a drum 110, a flexible member or cable 104 windable on the drum, connected at its distal end to a support member 42, and trained around a pair of pulleys 106 mounted on the frame 24 and a pulley 108 mounted on the support member 42. The cable 104 and pulleys 106 and 108 form a block and tackle mechanism which exerts a lifting force on the conveyor 50 which is approximately double the force on the cable 104 at the winch drum 110.

As best seen in FIGS. 1 and 2, the frame 24 is inclined upwardly toward the discharge end of the conveyor 50 and is parallel to the adjacent support member 42 when the conveyor is in a raised position as shown in FIG. 1. In this position, the cable 104 extends approximately transversely between the upper ends of the frame 24 and support member 42 so that the entire force exerted by the cable 104 is tangentially exerted on the support member 42. The inclined frame 24 also provides for an approximately tangential force exerted by the cable 104 when the conveyor 50 is in the lowered position as shown in FIG. 2. The weight of the conveyor 50 is partly counterbalanced by a plurality of spring means 112, here shown as torsion bars, each bar having one end affixed to a plate 56 and the other end affixed to the horizontal bight portion 48 of a support member 42, whereby each torsion bar twists about its axis as the conveyor is lowered to the floor 18 and exerts a lifting force on the conveyor.

In operation, the material to be fed is deposited in the hopper 62 with the auger in the lowered position, as shown in FIG. 2. The auger 82 moves the material along the floor 18 between the retaining walls 52 and 54. If a slug or chunk of material is encountered, the auger will swing upwardly and away from the retaining wall 54 providing a greater clearance for the material. The upward travel of the auger is limited by the lugs 72 engaging the opposite sides of the apertures 76 in order that the auger 82 will not rise so high that material will build up underneath the auger. After encountering a slug, the weight of the auger causes it to work its way back down to its lower or normal operating position close to the floor 18 and the retaining wall 54. The normally small clearance between the downturning side of the auger and the retaining wall 54 prevents a buildup of material on the down-turning side of the auger and the greater clearance between the discharge end 90 of the auger flight 86 from the support arm 70 reduces the plugging of material between the discharge end of the flight and the support arm and also reduces the impact load between the auger flight and support arm when a large chunk of material is being moved. After the material has built up along the length of the auger, the entire conveyor assembly 50 is raised in increments to the position shown in FIG. 1, permitting successive layers of material to be built up along the length of the bunk. When the conveyor 50 is in the raised position, the material moves beneath the retaining walls 52 and 54 on the floor 18 where it is accessible to the livestock.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A material distributing device comprising: a longitudinally extending supporting structure including a floor; a plurality of vertically swingable support members having one end pivotally mounted on the floor; a pair of upright, opposite, longitudinally extending retaining walls mounted on the support members for swinging in a vertical arc therewith between a lower position proximate to the floor and a raised position spaced above the floor; a plurality of auger support arms, each arm being mounted on a retaining wall; a longitudinally extending auger journaled on said support arms between the opposite retaining walls and above the floor and having an intake end and a discharge end; a drive means operably connected to the auger for rotating the auger to move material from the intake end to the discharge end; a frame means rigidly connected to the supporting structure; and suspension control means operatively interconnecting the frame means and the support members for selectively moving the support members and retaining walls between their alternate positions.

2. The invention defined in claim 1 wherein the auger axis is closer to one retaining wall than the other, the down-turning side of the auger being proximate to the closer retaining wall.

3. The invention defined in claim 1 wherein the auger support arms are rockably mounted on a retaining wall for swinging in a vertical arc between a first position wherein the auger is supported approximately in the same plane as the bottom edges of the retaining walls and a second position wherein the auger bottom is raised relative to said bottom edges.

4. The invention defined in claim 3 wherein, the first support arm position, the down-turning side of the auger is proximate to the retaining wall in which the support arm is mounted and the up-turning side of the auger is spaced from the other retaining wall a greater distance than the down-turning side is spaced from its adjacent wall, the auger moving away from and upwardly relative to the retaining wall on which the support arms are mounted as the support arms move to their second position.

5. The invention defined in claim 1 wherein the auger comprises a plurality of coaxially connected sections, each section including an axial shaft and a helicoid flight having an intake end and a discharge end, each section being rotatably supported at its ends by the support arms, the discharge ends of the auger flights having a greater clearance from the adjacent support arm than the intake ends.

6. The invention defined in claim 1 wherein the support members are inverted U-shaped members having their ends pivotally mounted on the floor on opposite sides of the retaining walls, and wherein the frame means includes an inverted U-shaped member having its lower end mounted on the floor on opposite sides of the retaining walls adjacent the lower ends of a support member.

7. The invention defined in claim 6 wherein the frame member and adjacent support member are aproximately parallel in the raised position of the retaining walls.

8. The invention defined in claim 7 wherein the suspension control means includes a winch mechanism having a flexible member extending approximately transversely between the frame member and the adjacent support member in the raised position.

9. A material distributing device comprising: a longitudinally extending supporting structure including a floor; a plurality of inverted generally U-shaped support members pivotally mounted at their ends on the floor for swinging in a longitudinal vertical arc between a raised and a lowered position; a pair of opposite, upright, longitudinally extending retaining walls carried by the support members for movement therewith between a lowered position proximate to the floor and a raised position above the floor in response to swinging of the support members; a frame means including an inverted U-shaped frame member rigidly extending upwardly from the supporting structure adjacent a support member, said support members being approximately parallel to the frame member in its raised position; a suspension control means operatively interconnecting the frame means and said support member for selectively moving the support members and retaining walls between their alternate positions; a plurality of auger support arms rockably mounted on a retaining wall for movement in a transverse vertical arc between first and second positions; a longitudinally extending auger journaled on said support arms between the retaining walls and having an axial shaft and a helical flight with an intake and discharge end, the flight of the auger being interrupted at each support arm, the intake side of the flight at each support arm being proximate to the support arm adjacent said shaft and the discharge side of the flight being spaced from the support arm adjacent the shaft a greater distance than the intake side; a drive means operably connected to the auger for rotating the auger to move material from the intake end toward the discharge end, the auger being carried by the support arm in the first support arm position with the down-turning side of the auger flight spaced from the adjacent wall a lesser distance than the up-turning side is spaced from the other wall, and swinging upwardly and away from the wall adjacent the down-turning side as the support arm moves to its second position.

10. A material distributing device comprising: a longitudinally extending supporting structure including a floor; a plurality of support members pivotally mounted on the floor for swinging in a longitudinal vertical arc between a raised and a lowered position; a pair of upright, opposite, longitudinally extending retaining walls carried by the support members for movement therewith between a lowered position proximate to the floor and a raised position above the floor in response to swinging of the support members; a frame means rigidly connected to the supporting structure; a suspension control means operatively interconnecting the frame means and said support members for selectively moving the support members and retaining walls between their alernate positions; a plurality of auger support arms rockably mounted on a retaining wall for movement in a transverse vertical arc between first and second positions; a longitudinally extending auger journaled on said support arms between the retaining walls and having an axial shaft, a helical flight, and an intake and a discharge end, the flight of the auger being interrupted at each support arm, the intake side of the flight at each support arm being proximate to the support arm at said shaft and the discharge side of the flight being spaced from the support at the shaft a greater distance than the intake side; a drive means operably connected to the auger for rotating the auger to move material from the intake end to the discharge end, the auger being carried by the support arm in the first support arm position with its down-turning side spaced from the adjacent wall a lesser distance than the up-turning side is spaced from the other wall, and swinging upwardly and away from the wall adjacent the down-turning side as the support arm moves to its second position.

11. A material distributing device comprising: a longitudinally extending supporting structure including a floor; a plurality of support members pivotally mounted on the floor for swinging in a longitudinal vertical arc between alternate positions; a pair of upright, opposite, longitudinally extending retaining walls carried by the support members for movement therewith between a lowered position proximate to the floor and a raised position above the floor in response to swinging of the support members; a frame means rigidly connected to the supporting structure; a suspension control means operatively interconnecting the frame means and said support members for selectively moving the support members and retaining walls between their alternate positions; a plurality of auger support arms mounted on at least one retaining wall; a longitudinally extending auger journaled on said support arms between the retaining walls and having an axial shaft, a helical flight, and an intake and a discharge end, the flight of the auger being interrupted at each support arm having a lesser clearance from the support than the discharge side of the adjacent flight; a drive means operably connected to the auger for rotating the auger to move material from the intake end to the discharge end, the auger being carried by the support arms with its down-turning side spaced from the adjacent wall a lesser distance than the up-turning side is spaced from the other wall.

12. In a material distributing device of the type having a longitudinally extending supporting structure including a floor, a plurality of longitudinally spaced inverted U-shaped support members having depending legs pivotally mounted at their lower ends on the floor for swinging in a longitudinal vertical arc, and a longitudinally extending conveyor means suspended from the support members between the legs for movement therewith between a raised position spaced above the floor and a lowered position proximate the floor, the combination therewith of frame means rigidly mounted on the supporting structure and including an inverted U-shaped frame member having depending legs on opposite sides of the conveyor means and mounted at their lower ends on the floor adjacent a support member, the legs being inclined and substantially parallel to the support member legs when the support member is in its raised position, and suspension control means interconnecting the frame member and adjacent support member for swinging of the support member and conveyor between alternate positions.

13. The invention defined in claim 12 wherein the suspension control means includes a winch mechanism having a flexible member extending approximately transversely between the frame member and the adjacent support member in the raised position.

14. In a material distributing device of the type having an elongated supporting structure including a floor, and a longitudinally extending conveyor means supported above the floor and including a pair of opposite upright retaining walls having horizontally coplanar bottom edges, an elongated auger suspended between the retaining walls, and drive means for rotating the auger, the improvement residing in improved support means for suspending the auger between the retaining walls comprising a plurality of longitudinally spaced support arms pivotally mounted on one retaining wall for swinging in a transverse vertical arc, stop means operably engaging said support arms for limiting their movement between first and second positions, the auger being journaled in said support arms with the bottom of the auger being approximately coplanar with the bottom edge of the retaining walls in the first support arm position and elevated relative to said bottom edges of the retaining walls in the second support arm position.

15. In a material distributing device of the type having a longitudinally extending supporting structure including a floor, a longitudinally extending conveyor means, and means for suspending the conveyor above the floor, the improvement residing in an improved conveyor means comprising: a longitudinally extending material retaining means forming a longitudinally extending passageway; a plurality of longitudinally spaced support arms pivotally connected to the retaining means for swinging in a transverse vertical plane relative thereto and projecting into said passageway; a longitudinally extending auger mounted on the support arms for vertical floating movement therewith within the passageway; and stop means on the support arms for establishing the lower position of the auger relative to the retaining means, the auger being raisable against the force of gravity to a raised position whereby relatively large pieces of material are movable along the passageway below the auger.

16. A material distributing device comprising: a longitudinally extending supporting structure including a floor; a pair of upright, opposite, longitudinally extending retaining walls having horizontally coplanar bottom edges; suspension means operative between the supporting structure and the retaining walls for vertically adjustably suspending the retaining walls above the floor, the space between the retaining walls being open downwardly to the floor; a longitudinally extending auger; a drive means for rotating the auger; and support means operatively interconnecting the auger and at least one retaining wall and journaling the auger between the retaining walls with the down-turning side of the auger proximate to one retaining wall, the down-turning side of the auger being spaced a substantially lesser distance from said retaining wall than the space between the up-turning side and the opposite retaining wall, the support means including a plurality of longitudinally spaced support arms pivotally mounted on the retaining walls adjacent the down-turning side of the auger for swinging in a limited transverse vertical arc between alternate positions, the auger being journaled on said support arms and supported with its bottom approximately coplanar with the bottom edge of the retaining walls in one position and swinging in a vertical arc upwardly and away from the retaining wall adjacent the down-turning side to its alternate position with its bottom elevated relative to the bottom edge of the retaining walls.

References Cited
UNITED STATES PATENTS

| | | | |
|---|---|---|---|
| 610,440 | 9/1898 | Fredrickson | 198—213 X |
| 1,099,956 | 6/1914 | Williams | 198—213 |
| 1,866,005 | 7/1932 | Beaty | 198—213 |
| 3,116,716 | 1/1964 | Sime | 198—64 X |
| 3,215,252 | 11/1965 | Wilkes | 198—64 |
| 3,245,516 | 4/1966 | Wilkes | 198—64 |
| 3,251,454 | 5/1966 | Buschbom | 198—64 |
| 3,251,467 | 5/1966 | Baake | 209—241 |

EVON C. BLUNK, *Primary Examiner.*

H. J. HICKEY, *Assistant Examiner.*